UNITED STATES PATENT OFFICE.

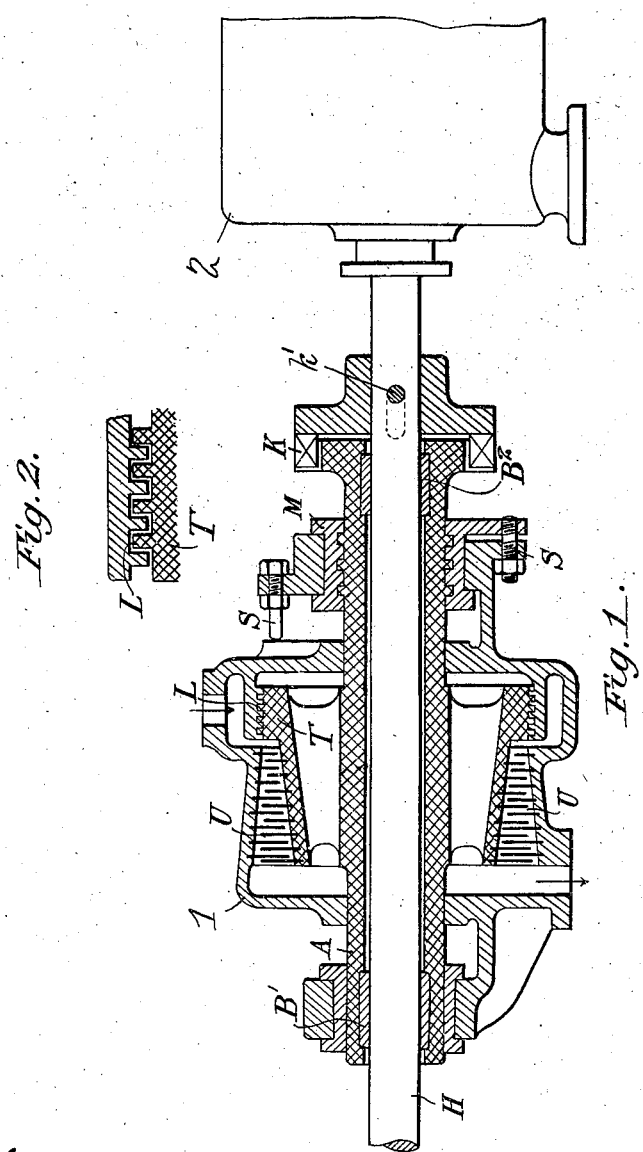

ERIC BROWN, OF BADEN, SWITZERLAND.

MEANS OF COUPLING TURBINES.

No. 828,301.  Specification of Letters Patent.  Patented Aug. 14, 1906.

Application filed June 7, 1906. Serial No. 320,646.

*To all whom it may concern:*

Be it known that I, ERIC BROWN, a subject of the King of Great Britain, and a resident of Baden, Switzerland, have invented certain new and useful Improvements in Means for Coupling Steam-Turbines, of which the following is a specification.

The subject of my invention is an improvement in the means of coupling steam-turbines, and is designed for use in those cases in which two or more separate steam-turbines, either each for itself or in conjunction, drive a common shaft in the same direction. The invention is therefore particularly applicable when steam-turbines are employed for the propulsion of ships.

According to this invention the rotary element of a steam-turbine is mounted on a hollow shaft through which there freely passes or in which there is mounted a solid shaft, and the problem, well known in the case of land steam-turbines with separate adjacent shafts, of rendering the rotary element of the one turbine adjustable independent of that of the other by means of a longitudinally-moving clutch is solved by the latter being located between the solid and the hollow shaft in such manner that part of the turbine mounted on the hollow shaft, which is dependent upon the clutch, is rendered adjustable in axial direction relatively to the remaining turbine parts, the clutch at the same time, owing to its longitudinal movement, admitting of such adjustability. By this arrangement the possibility is presented of the rotary element and the blades connected with it, and likewise the packing parts, being adjusted in axial direction for the turbine in question independent of the adjustment in the other turbines working on the same common shaft.

The clutch is preferably one capable of disengagement, so that the hollow shaft, with its turbine, may be brought to rest when this turbine is not required to work.

My invention is illustrated diagrammatically in the accompanying drawings, in which—

Figure 1 is a view showing a part of one turbine in elevation and another turbine in section with a single shaft common to the two turbines, Fig. 2 a detail view showing a portion of the packing parts drawn to a longer scale.

In the drawings I have for convenience indicated but two turbines, (numbered 1 and 2,) the first of these being shown in section and the second in elevation.

A is the hollow turbine-shaft, which receives the solid shaft H, with guide-blocks B' B².

K is the clutch which couples the shafts A H and whose engaging members allow a relative axial motion.

S represents staying and adjusting bolts, which with the aid of the two-part corrugated bearing M, secured to the turbine-casing, enable the turbine rotary element T, mounted on the hollow shaft, with its blades V and the rings of the corrugated packing L, to be adjusted in axial direction relatively to the corresponding parts on the stationary casing.

In order that the clutch may be operated to disconnect the tubular shaft from the solid shaft, it is only necessary to move it longitudinally away from the tubular element sufficiently to disengage the interlocking parts, this movement being permitted by the elongated slot of the clutch member (shown in dotted lines) with which the pin k' on the shaft engages.

Having thus described my invention, what I claim is—

1. In combination, a plurality of steam-turbines coaxially arranged and each comprising a stationary and a rotary element, a tubular shaft for each turbine by which the rotary element is carried, means whereby such tubular shaft and its rotary element may be adjusted longitudinally of the stationary element, a single shaft common to all the turbines and extending into the tubular shafts, and clutch mechanism interposed between each tubular shaft and the single shaft, substantially as described.

2. In a steam-turbine, a stationary element, a rotary element within the same, a tubular shaft upon which the rotary element is rigidly carried, means for adjusting the tubular shaft with its rotary element longitudinally with relation to the stationary element, a driving-shaft extending through the tubular shaft, and clutch mechanism interposed between the tubular shaft and driving-shaft, substantially as described.

3. In a steam-turbine, a stationary element, a rotary element within the same, a tubular shaft upon which the rotary element is rigidly carried, means for adjusting the tubular shaft with its rotary element longitudinally with relation to the stationary element, a driving-shaft extending through the tubular shaft, and means for connecting and disconnecting the tubular shaft and driving-shaft irrespective of the adjustment of the tubular shaft, substantially as described.

In testimony whereof I have signed my name to this specification in the presence of two subscribing witnesses.

ERIC BROWN.

Witnesses:
RUDOLF STAUL,
A. E. STOLL.